United States Patent [19]
Kohler et al.

[11] 3,925,514
[45] Dec. 9, 1975

[54] RUBBER IMPROVEMENT WITH POLYCYCLOPENTENE

[75] Inventors: Jacques R. Kohler; Frederik L. Binsbergen, both of Amsterdam, Netherlands

[73] Assignee: Shell Oil Company, Houston, Tex.

[22] Filed: Aug. 5, 1974

[21] Appl. No.: 494,580

[52] U.S. Cl. .......................... 260/889; 260/33.6 AQ
[51] Int. Cl.² ....................... C08L 9/06; C08L 23/2
[58] Field of Search ....................... 260/889, 888

[56] References Cited
UNITED STATES PATENTS 3,816,358   6/1974   Nordsiek et al. .................. 260/887

FOREIGN PATENTS OR APPLICATIONS 2,123,452   11/1972   Germany

*Primary Examiner*—Murray Tillman
*Assistant Examiner*—J. Ziegler

[57] ABSTRACT

The green strength of a butadiene rubber, such as SBR or polybutadiene, is improved by adding up to about 50 phr of a polycyclopentene having an LVN of at least 4 dl/g.

7 Claims, No Drawings

RUBBER IMPROVEMENT WITH POLYCYCLOPENTENE

DESCRIPTION OF THE PRIOR ART

The green strength of an elastomer measures the suitability of the elastomer for conventional rubber processing such as milling, handling and manufacturing operatins, and is determined by conventional tensile tests. In general, synthetic elastomers such as polyisoprene (IR) and random styrene/butadiene copolymers (SBR) inherently possess inadequate green strength whereas natural rubber has sufficient green strength without modification.

The customary practice in improving the green strength, building tack and heat buildup of synthetic elastomers is to incorporate natural rubber in the blend. Before such incorporation is possible, however, the natural rubber has to be masticated so as to reduce its molecular weight to a level suitable for mixing. This expensive mastication along with the fluctuating price of natural rubber make the practice of using natural rubber to improve the green strength of synthetic elastomers unattractive.

West German patent application OLS 2,123,452 equivalent to Graulich et al., U.S. Pat. No. 3,769,369 teaches that the green strength and tack of polyisoprene rubber is improved by incorporating in the polyisoprene a polycyclopentene (PCP) of medium molecular weight, i.e., having a Mooney viscosity of about 110. This Mooney viscosity corresponds to a limiting viscosity number (LVN) of about 2.8 dl/g. [As used herein, LVN is a test for measuring viscosity and is conducted in toluene at 25°C]. When a polycyclopentene of medium molecular weight, i.e., having an LVN of about 3 dl/g, is incorporated in a butadiene rubber such as SBR, there is no significant improvement in green strength of the SBR.

SUMMARY OF THE INVENTION

This invention is a process to improve the green strength of butadiene rubber by admixing the butadiene rubber with from about 5 to about 50 phr (parts per hundred rubber) of a high molecular weight polycyclopentene having an LVN of at least 4 dl/g and having from about 75% to about 99% of the double bonds present in the transconfiguration.

DETAILED DESCRIPTION OF THE INVENTION

While it is known that medium molecular weight polycyclopentenes having an LVN below 3.0 dl/g improve the green strength and tack of polyisoprene rubber, these same polycyclopentenes do not significantly improve the green strength of butadiene rubbers. The term "butadiene rubber" denotes a class of elastomers which encompass both butadiene homopolymer (polybutadiene) and copolymers of butadiene (e.g., styrene/butadiene rubber, SBR). Furthermore, in the usual situation, higher molecular weight polymers, that is those having an LVN of at least 4 dl/g, cannot readily be incorporated and finely distributed in lower molecular weight butadiene rubbers by ordinary rubber compounding equipment. The present invention, however, involves the admixing of a butadiene rubber with a high molecular weight polycyclopentene such that the green strength and processability of the rubber is improved.

In particular, the present invention relates to a process of admixing butadiene rubber with from about 5 to about 50 phr of a high molecular weight polycyclopentene having an LVN of at least 4 dl/g, preferably from about 7 dl/g to about 9 dl/g, such polycyclopentene also having from about 75% to about 99% of the double bonds present in the trans configuration. The process according to the invention is accomplished by means of the usual compounding apparatus known to those in the art, and the usual additional ingredients such as extender oils, vulcanizing agents, carbon black and antioxidants may be incorporated into the rubber composition. The resultant polycyclopentene/butadiene rubber composition has an improved green strength and processability as compared to butadiene rubber composition free from polycyclopentene and is not subject to the difficulties encountered when natural rubber is combined with the butadiene rubber to improve green strength. In addition, whereas the green strength of oil-extended rubbers drops to low levels, the polycyclopentene/butadiene rubber compositions according to the present invention, even those compositions containing from about 25 to about 50 phr of an aromatic extender oil, retain desirable green strength levels.

In a particularly preferred embodiment of the present invention, the polycyclopentene consists of a mixture of high molecular weight polycyclopentene and low molecular weight polycyclopentene, the low molecular weight polycyclopentene having an LVN below 4 dl/g, preferably between about 0.2 and about 2.0 dl/g. In this preferred embodiment, the weight ratio of high molecular weight to low molecular weight polycyclopentene is preferably from about 95:5 to about 40:60. The advantages of employing binary polycyclopentene blends are shown by the results found in Table IV. From the table, it is shown that the Mooney viscosity of the rubber compounds containing binary polycyclopentene blends ranged from about 75 to about 88, such Mooney viscosity levels indicating ease of processibility. In comparison, a compound based on an 80:20 SBR/PCP blend containing polycyclopentene having an LVN of about 5.0 dl/g, had a tensile strength of about 0.5 MN/m$^2$ and a Mooney viscosity of about 105. Since a Mooney viscosity of 105 is on the high side for processing purposes, the advantage of employing binary polycyclopentene blends is evident.

The polycyclopentenes used in the present invention are prepared by various conventional methods. The ring-opening polymerization of cyclopentene in the presence of suitable catalysts is well-known in the art, e.g., Kautschuk and Gummi. Kunststoffe 23 (1970) 502-507. The microstructure varies from high trans content, e.g., from about 30% to about 100% trans content, to 100% cis content. Polycyclopentenes to be used in compositions according to the invention preferably have about 75% to about 99% of the double bonds present in the trans configuration. Polycyclopentenes having a high trans content are obtained by polymerization of cyclopentene in the presence of an organometallic compound such as an alkylaluminium and a tungsten compound such as $WCl_6$ as taught in U.S. Pat. No. 3,492,245. High trans content polycyclopentene has been obtained with the use of tetraphenoxytungsten dichloride and ethylaluminium dichloride. Suitable polycyclopentenes are homopolymers of cyclopentene, preferably having an LVN of about 6 to about 10, and in particular having an LVN of about 7 to about 9 dl/g. Also useful are blends of two or more polycyclopentenes having differnt LVN's, e.g., 8 and 3, the blend having an LVN of e.g., 5.5 dl/g. The amount of polycyclopentene in the butadiene rubber is generally at least 5 phr, in particular between about 10 phr and about 25 phr.

Suitable butadiene rubbers include homopolymers of butadiene or copolymers of butadiene with such monomers as e.g., styrene, vinyltoluene and acrylonitrile. The invention is of particular interest for copolymers of butadiene containing from about 10% to about 30 % wt styrene. Usually it will be advantageous to employ copolymers of butadiene/styrene, blended with butadiene homopolymer, preferably in a ratio of about 95:5 to about 60:40. The butadiene rubbers usually have a Mooney viscosity, ML-4 at 100°C, between about 40 and 100, and an LVN between about 1 and about 10 dl/g.

To further illustrate the invention, the following illustrative embodiments are offered:

ILLUSTRATIVE EMBODIMENT I

The butadiene rubber used was SBR having a styrene content of 21% w obtained by solution polymerization in the presence of butyllithium. The rubber was extended with 37.5 phr of "DUTREX" oil, a highly aromatic extender oil having a specific gravity of 1.03 g/ml, a viscosity of 832 cS at 37°C and an aromatics content of 83% w. The polycyclopentenes (PCP) used had a trans content of 90% and were obtained by bulk polymerization of cyclopentene in the presence of tetrakis(1,5-diisopropylphenoxy)-tungsten dichloride and ethylaluminium dichloride in the presence of 1-pentene as a molar weight regulator. The LVN's of the SBR and CPC, measured prior to oil extension, if any, are indicated in the table. In some cases, the polymers were mixed in toluene solutions, (indicated as "sol.") in other cases in a Meili internal mixer (indicated as "Me"). Despite the large differences in LVN between the PCP and the oil-extended SBR, no special difficulty was encountered during the blending in the Meili mixer was medium shear. After removing the toluene, in the case of solution mixing, the polymer blends were compounded either on a mill or in an internal Meili mixer in proportions expressed in parts by weight as follows:

polymer blend-100; ZnO-5; stearic acid-3; "Santoflex" 13 (N-(1,3-dimethylbutyl)-N'-phenyl-p-phenylene diamine)-1.5; "Santoflex" 77 (N,N'-bis(1,4-dimethylpentyl)-p-phenylene diamine)-1.5; wax-1; "DUTREX"-3.5; sulphur-2; "Santocure" (N-cyclohexyl-2-benzothiazole sulfenamide)-1; carbon black ISAF-50.

The weight ratio of SBR/PCP in the experiments is the weight ratio of oil-extended rubber to PCP whereas the LVN of the SBR/PCP is taken before oil extension. The energy input was taken during the tensile test and the elongation at break and tensile strength were determined according to ASTM-D-412 except that the test dumbbells were stamped out from test plates of 0.15 cm thickness by means of die C. The test plates were prepared by pressing the compositions at 80°C for 5 minutes after the composition had been allowed to stand overnight at room temperature. Subsequently, the mechanical properties were measured after the pressed plates had been allowed to stand overnight at room temperature. Note that in experiment No. 6, the PCP consists of 14.5 parts by weight of polycyclopentene and 5.5 parts by weight of "DUTREX" oil. Experiments a and b were conducted for comparison purposes only.

Evaluation of the resulting blends are found in the following Table I:

Table 1

| Experiment | a | 1 | 2 | 3 | 4 | 5 | 6 | 7 | b |
|---|---|---|---|---|---|---|---|---|---|
| Weight ratio SBR/PCP | 100/0 | 90/10 | 85/15 | 85/15 | 85/15 | 85/15 | 80/20 | 80/20 | 85/15 |
| LVN of SBR/PCP | 2.75/ | 2.6/ 7.2 | 2.45/ 7.2 | 2.75/ 7.2 | 2.75/ 7.7 | 2.75/ 7.7 | 2.75/ 7.2 | 2.75/ 7.7 | 2.75/ 3.3 |
| LVN of blend, dl/g | 2.1 | 2.3 | 2.3 | 2.6 | 2.6 | 2.6 | 2.5 | 2.6 | 2.2 |
| Blending | — | sol. | sol. | sol. | Me | Me | sol. | Me | sol. |
| Compounding | mill | mill | mill | mill | mill | Me | mill | Me | mill |
| Processability | aver. | good | excel. | good | good | — | good | — | good |
| Compound properties (unvulcanized): tensile strength, MN/m² | 0.20 | 0.29 | 0.57 | 0.43 | 0.62 | 0.54 | 0.41 | 1.15 | 0.17 |
| elongation at break,% | 250 | 740 | 1480 | 1350 | 830 | 1170 | 1970 | 1500 | 380 |
| energy input, J/ml | 0.5 | 3.2 | 7.8 | 6.6 | 4.8 | 6.1 | 8.4 | 13.4 | 1.3 |

ILLUSTRATIVE EMBODIMENT II

The procedures of Illustrative Embodiment I were repeated except that the butadiene rubber used was a butyllithium-catalyzed, solution-polymerized butadiene homopolymer (BR). In experiments c and 8, the rubber was extended with 37.5 phr of "DUTREX" oil; in experiments 9 and 10, no oil-extension was applied in the blend. The compounding recipe was the same as used in Illustrative Embodiment I except that the amount of "DUTREX" was 5, of sulphur, 1.8 and of "Santocure", 1.2 parts by weight. The weight ratio in experiments c and 8 is the weight ratio of oil-extended rubber to PCP whereas the LVN's of the BR/PCP were all taken before oil extension. Experiment c is for comparison only. Results appear from the following Table II:

Table II

| Experiment | c | 8 | 9 | 10 |
|---|---|---|---|---|
| weight ratio BR/PCP | 100/ | 85/15 | 85/15 | 85/15 |
| LVN's of BR/PCP | 2.7/ | 2.7/7.7 | 1.45/6.0 | 1.65/7.2 |
| LVN of blend, dl/g | 1.9 | 2.5 | 2.0 | 2.3 |
| Vinyl content of BR,% | 10 | 10 | 10 | 53 |
| Blending | — | Me | sol. | sol. |
| Compounding | mill | mill | mill | mill |
| Compound properties (unvulcanized): tensile | | | | |

Table II-continued

| Experiment | c | 8 | 9 | 10 |
|---|---|---|---|---|
| strength, MN/m² | 0.22 | 0.44 | 1.22 | 0.38 |
| elongation at break,% | 175 | 690 | 910 | 1130 |
| energy input, J/ml | 0.45 | 3.1 | 6.0 | 4.7 |
| processability | poor | good | good | excellent |

ILLUSTRATIVE EMBODIMENT III

The procedure of Illustrative Embodiment I was repeated except that the butadiene rubber used was an S 1500-type, emulsion-polymerized, "cold" SBR having an LVN of 2 dl/g and a styrene content of 23.5 % w. Four types of PCP were used, having LVN's of 7.3, 5.0, 1.5 and 0.55 dl/g, respectively. Three binary PCP blends were prepared in a Brabender Plastograph (70°C/3 minutes) as shown in Table III.

Table III

| Blend | A | B | C |
|---|---|---|---|
| LNV's of PCP components | 7.3/1.5 | 7.3/0.55 | 5.0/0.55 |
| weight ratio of components | 43/57 | 51/49 | 78/22 |

The PCP blends were subsequently blended with the SBR in a weight ratio PCP/SBR of 20:80. The blends so obtained were subsequently compounded on a two-roll mill at 70°C for 15 minutes according to the following recipe in proportions expressed in parts by weight: polymer blend-100; ZnO-5; stearic acid-3; "Santoflex" 13-1.5; "Santoflex" 77-1.5; HAF black -50; "DUTEX"-3.5; "Santocure"-1.2; sulphur-1.8. The green strength properties of the unvulcanized compounds were as shown in Table IV where d is shown for comparision only.

Table IV

| Experiment | 11 | 12 | 13 | d |
|---|---|---|---|---|
| PCP blend used | A | B | C | — |
| Mooney, ML(1+4), 100°C | 82 | 76 | 88 | 70 |
| tensile strength, MN/m² | 0.60 | 0.9 | 0.9 | 0.20 |
| elongation at break, % | 1900 | 2000 | 1750 | 500 |
| energy input, J/ml | 10.5 | 13.0 | 13.1 | 1.5 |

We claim as our invention:

1. A process for improving the green strength of a butadiene rubber selected from the group consisting of butadiene homopolymers and copolymers of butadiene containing at least 70% butadiene by admixing said butadiene rubber with from about 5 to about 50 parts per hundred rubber (phr) of a high viscosity polycyclopentene having a limiting viscosity number (LVN) of at least 4 dl/g and having about 75% to 99% of the double bonds present in the trans configuration.

2. A process according to claim 1 wherein the polycyclopentene is a homopolymer of cyclopentene having an LVN of about 7 to 9 dl/g.

3. A process according to claim 1 wherein the polycyclopentene is present in an amount of from about 10 to about 25 phr.

4. A process according to claim 1 wherein the polycyclopentene consists of a mixture of low viscosity and high viscosity polycyclopentene, the low viscosity polycyclopentene having an LVN between about 0.2 and about 4.0 dl/g and in which the weight ratio of high viscosity to low viscosity polycyclopentene is from about 95:5 to about 40:60.

5. A process according to claim 1 wherein the butadiene rubber is a copolymer of butadiene containing from about 10% to about 30% by weight styrene.

6. A process according to claim 1 wherein the butadiene rubber consists of a copolymer of butadiene/styrene and a butadiene homopolymer in a weight ratio of from about 95:5 to about 60:40.

7. The butadiene rubber composition prepared by admixing a butadiene rubber selected from the group consisting butadiene homopolymers and copolymers of butadiene with from about 5 to about 50 parts per hundred rubber of high viscosity polycyclopentenamer having a limiting viscosity number of at least 4 dl/g and having about 75% to 99% of the double bonds present in the trans configuration.

* * * * *